Aug. 28, 1962 P. J. FRIEDMAN 3,050,867
ASSEMBLY FOR EMPLOYING DRIER EXHAUST HEAT
FOR PREHEATING INLET WATER
Filed April 20, 1960
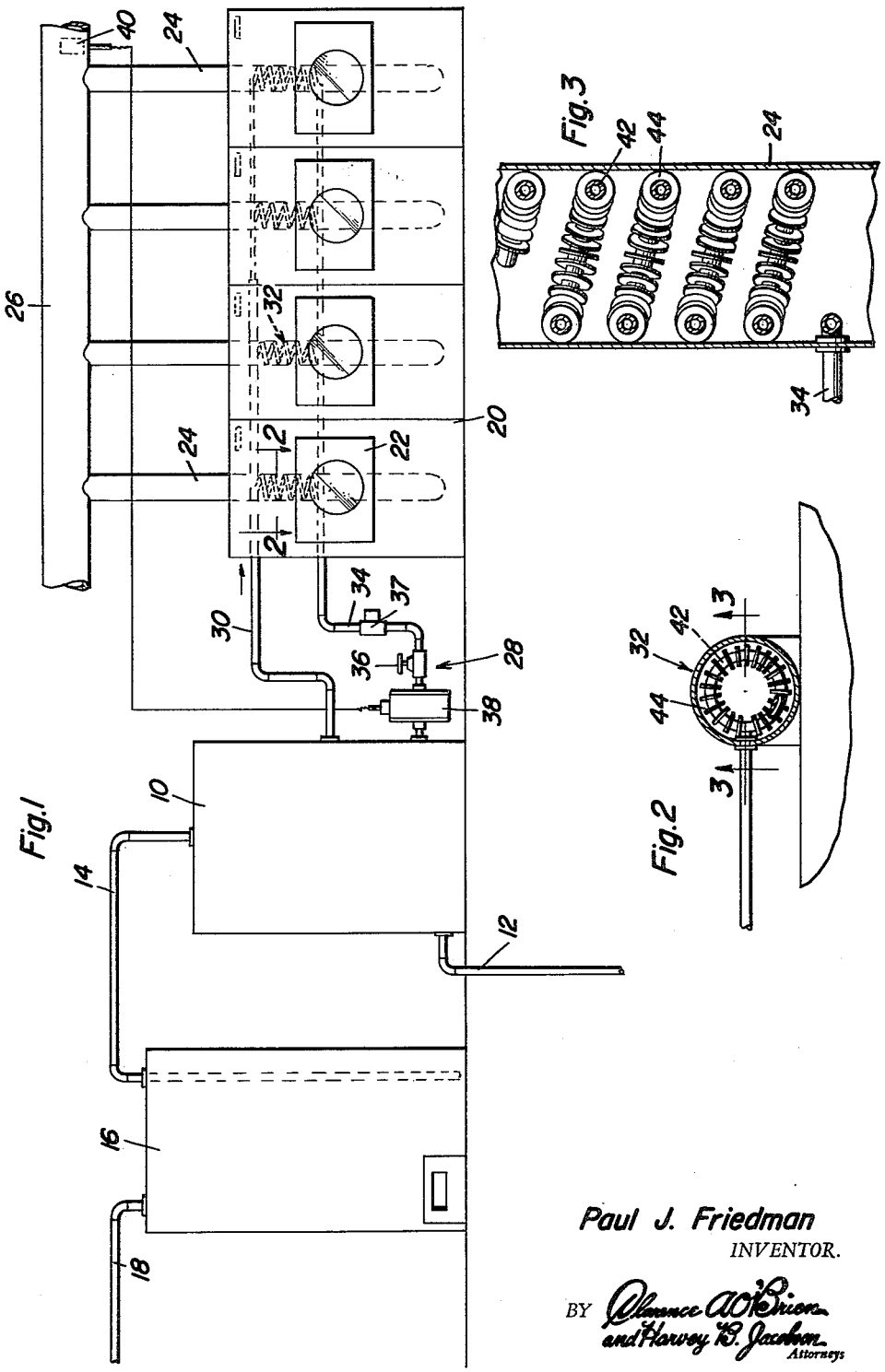
Paul J. Friedman
INVENTOR.

United States Patent Office 3,050,867
Patented Aug. 28, 1962

3,050,867
ASSEMBLY FOR EMPLOYING DRIER EXHAUST HEAT FOR PREHEATING INLET WATER
Paul J. Friedman, 1423 Hillcrest Road, Lancaster, Pa.
Filed Apr. 20, 1960, Ser. No. 23,476
6 Claims. (Cl. 34—86)

The present invention generally relates to a water preheater and more particularly to a water preheater which employs the normally exhausted heat from a drier for laundry items.

It is present day practice to provide centrally located coin operated washing machines together with coin operated driers. Inasmuch as there usually are quite a number of washing machines installed in a single building, it is necessary to provide a relatively large hot water making device to supply the washing machines with adequate hot water. In addition, the driers have a considerable discharge of heated air which normally is exhausted to the atmosphere by virtue of an exhaust conduit or pipe which extends to the atmosphere. The pipe may be in the form of a manifold in which several driers discharge the exhaust heat into for carrying the exhaust heat to the exterior of the building or may be in the form of individual exhaust stacks. Therefore, it is the primary object of the present invention to provide a novel and efficient assembly for utilizing the exhaust heat from the driers for preheating the inlet water for the hot water making device thus raising the inlet water temperature a substantial amount while reducing the discharge temperature of the exhaust heat from the driers.

Briefly, the present invention incorporates the provision of a heat exchange coil preferably of the finned coil type although other types of copper coils of various length could be used, the coils being disposed within the exhaust stack or conduit of each drier. The heat exchanging coil has the ends thereof connected to water lines extending from a preheated water storage tank so that the water as it is heated will be stored in the preheated water tank with the preheated water storage tank being connected with the hot water making device so that the inlet water for the hot water making device is considerably raised from the normal inlet water temperature thereby increasing the efficiency of the hot water making device thus lowering the over-all cost of operating the laundry.

Another object of the present invention is to provide a water preheater orientated in the manner described which adds no cost whatsoever to the operation of the driers and does not affect the efficiency of operation of the driers and only utilizes normally wasted heat for preheating raw water on the inlet side of a hot water heater or hot water maker which enables the hot water maker to produce more hot water at a given high temperature, or, on the other hand, enables installation of a smaller hot water maker for supplying the same number of washing machines.

Yet another object of the present invention is to provide a water preheater of the character described having a thermostatic control for rendering the preheater inoperative when the temperature in the exhaust stacks or manifold of the driers reaches a predetermined low temperature and will automatically actuate the preheater when the temperature of the exhaust manifold for the driers reaches a predetermined temperature thereby preventing circulation of cool water through the coils in the exhaust conduits of the driers when they are inoperative.

Yet another feature of the present invention is to provide a water preheater as set forth in the preceding objects which is simple in construction, easy to install, long lasting, dependable, efficient in operation and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic view illustrating the relationship of the driers, the exhaust conduits and the other components of the invention generally showing the relationship of the component parts;

FIGURE 2 is a transverse, plan sectional view taken substantially upon a plane passing along section line 2—2 of FIGURE 1 illustrating the relationship of the exhaust stack or conduit to the heat exchange coil mounted therein; and FIGURE 3 is a longitudinal, vertical sectional view, on an enlarged scale, taken substantially upon a plane passing along section line 3—3 of FIGURE 2 illustrating the details of construction of the coil and its relationship to the exhaust conduit or stack.

Referring now specifically to the drawings, a typical installation is illustrated in FIGURE 1 in which the numeral 10 designates a water storage tank having a raw water inlet pipe 12 connected thereto adjacent the bottom. The water inlet pipe 12 is connected to any suitable source or supply such as a city water line or the like. Connected to the top of the storage tank 10 is a discharge line 14 for preheated water which extends to a hot water maker or hot water heater 16. The preheated water line 14 is an inlet for the hot water maker 16 and extends downwardly and terminates adjacent the bottom of the hot water maker 16. The hot water maker or hot water heater 16 may be of any conventional type and may be gas fired or heated in any other suitable manner. The upper end of the hot water heater 16 is provided with a hot water outlet pipe 18 connected to a series of washing machines in any manner whatsoever.

The present invention is associated with a plurality of driers 20 which are normally provided in a laundromat for drying the clothes that have been washed in the washing machine and each of the driers 20 is of a conventional construction as far as the manner in which the driers are heated together with the manner in which the clothes are placed therein and removed therefrom such as by way of a door 22. Each of the driers 20 is provided with an exhaust conduit or exhaust stack 24 for discharging the hot humid air therefrom. It will be appreciated that when the drying cycle initially begins, the discharge from the drier will be quite humid while the humidity decreases as the clothes are dried since the heated air will pick up less and less moisture until the clothes are completely dry. Inasmuch as there are normally a plurality of driers located in a laundromat, the exhaust conduits or stacks 24 are communicated with an exhaust header or manifold 26 which extends out through the building wall or roof to the atmosphere for normally discharging the heated air to the atmosphere. The present invention will utilize a portion of the heat that is normally discharged to the atmosphere for preheating the water in the storage tank 10.

The preheating of the water is accomplished by a circulating system generally designateed by the numeral 28 and including an inlet water line 30 for supplying water from the central area of the storage tank 10 into a plurality of coil assemblies generally designated by the numeral 32 with each coil assembly being disposed in an exhaust conduit 24. Each of the coil assemblies 32 is provided with a water return line which carries preheated water and which is designated by the numeral 34. The preheated water line 34 is provided with a throttling valve 36 to govern the flow of water through the coil assembly and also a circulating pump 38 for circulating the water through the circulating system 28. The circulating pump 38 discharges the preheated water back into the tank 10′ below the center thereof and generally opposite to the raw water intake for mixing with the raw water and generally elevating or modifying the temperature thereof upwardly.

The circulating pump is controlled by a thermostat 40 located in the exhaust manifold 26 outwardly of the exhaust conduits 24 whereby the thermostat 40 will maintain the circulating pump 38 inoperative until such time as the temperature in the exhaust manifold 26 has reached a predetermined minimum. The circulating pump 38 is of any suitable construction in which the pump is operated by an electric motor or the like.

In an actual installation, the raw water inlet temperature coming in through pipe 12 currently is 38° F. although this will vary somewhat during the various seasons of the year. The thermostat 40 is set for approximately 80° F. and the temperature in the exhaust stacks 24 is normally about 175° F. Initially, the water going into the preheater intake line 30 will be the same as the raw water coming into the pipe 12 but after the device has been operating, the temperature of the water in the preheater inlet line 30 will approximate 60° F. water since it has been preheated somewhat by the return preheated water in the conduit 34. The return preheated water has been found to be approximately 80° F. which will mingle with the incoming water and provide a preheated water temperature of approximately 75° F. which may be discharged through the line 14 into the hot water maker 16. Of course, the temperature of the water from the hot water maker 16 is set at a predetermined temperature such as 145° F. which is ideal for operation of automatic washing machines. As the temperature of the raw water inlet rises, of course, the temperature of the preheated water will also rise and also, the temperature of the preheated water will vary somewhat depending upon the number of driers actually in operation.

Taking the inlet for the preheaters from the center of the storage tank provides a modulated temperature for the inlet of the coil assemblies 32 thus preventing condensation. For successfully operating 20 washing machines, a storage tank having a capacity of 220 gallons has been found to be adequate together with a 145 gallon capacity hot water maker. Also, driers normally operate with either a six inch or an eight inch exhaust stack 24 and the coil assembly 32 generally is in the form of a coil copper tube 42 having a three-quarter inch outside diameter with a plurality of fins 44 thereon. The fins 44 are actually of one-piece construction with the tube and each coil includes 25 feet of finned tube with the fins being orientated eight to one inch of tube. The finned tube is formed in a cylindrical coil to provide the least possible restriction to flow of air and this orientates the fins 44 in inclined relation to the longitudinal axis of the exhaust stack 24 whereby the exhaust air will be slightly turned as it proceeds past the fins thereby increasing the heat exchange relationship between the fins and the air due to the air friction or skin friction of the heated air against the surface of the fins as the heated air passes over the fins.

The coiled fin heat exchanger has the ends thereof extending radially and through the exhaust stack with a suitable flanged coupling being provided for closing the opening through which the tubes extend. In the water supply line to the heat exchangers, the line may be reduced in size from the first to the second heat exchanger and from the second to the third heat exchanger coil, etc. so that a given quantity of water will flow through the different heat exchangers.

While finned coils have been specifically illustrated, the present invention also includes the use of other type heat exchanger assemblies such as a smooth copper tube coil which may be of any desired length. Also, in lieu of the single manifold and thermostat, each dryer may be provided with an exhaust stack and a thermostat. There is also provided a thermostatic valve 37 in the inlet of the circulator which controls the flow of water and this valve may be operated in response to a thermostat or progressively solenoid operated in response to the discharge temperature of the exhaust heat for controlling the rate of water flow.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A preheating assembly for laundries employing a plurality of washing machines requiring hot water, a hot water heater for supplying such washing machines, a plurality of driers for drying the washed clothes, said preheater assembly including an exhaust manifold for the hot air discharged from the driers, an exhaust stack connecting each drier to the manifold, a heat exchanger coil disposed in each exhaust stack, a water storage tank supplying water directly to said hot water heater wherein the supplying connection between said storage tank and the hot water heater comprises the sole means by which water can be fed to the hot water heater, and a circulating system interconnecting the storage tank and the heat exchanger coil for circulating water through the coil for heating the water in the storage tank by employing the exhausted heat from the driers, thus increasing the capacity of the hot water heater, said storage tank being connected adjacent the bottom thereof with a water inlet for raw water, said tank having an outlet to the heat exchanger coils at the central portion of the storage tank, said circulating system having a discharge at the bottom of the storage tank for modulating the temperature of the incoming water for passage through the heat exchanger coils for reducing condensation of moisture on the external surface of the heat exchanger coils.

2. The assembly as defined in claim 1 wherein said heat exchanger coil is in the form of a one piece coiled tube and fin assembly arranged in a cylindrical manner with the fins being slightly angularly disposed in relation to the longitudinal axis of the exhaust stack.

3. The assembly as defined in claim 1 wherein said circulating system includes a pump powered by an electric motor, and a thermostatic control for said circulating pump, said thermostatic control being disposed in the exhaust manifold for preventing operation of the circulating pump until the temperature in the exhaust manifold has reached a predetermined minimum.

4. In combination with a clothes drier having an exhaust duct communicated therewith, a hot water heater for supplying hot water to washing machines or the like, a water storage tank receiving raw water in the bottom thereof and communicating with the hot water heater from the top thereof whereby the water discharged from the top portion of the storage tank into the water heater will comprise the only supply to said water heater, and a heat exchange device disposed in the exhaust duct of the drier including a water inlet conduit connected with the water storage tank and a water outlet pipe connected to the storage tank for circulation of water from the storage tank through the heat exchange device for employing the normally wasted heat passing through the exhaust duct for raising the temperature in the storage water tank thereby raising the inlet temperature of the hot water heater for increasing the capacity thereof, said water inlet conduit including a pipe connected with the storage tank adjacent the center thereof, said outlet conduit for the heat exchanger device including a pipe connected to the storage tank adjacent the bottom thereof whereby tempered water will be circulated through the heat exchange device to prevent condensation on the exterior surface of the water inlet pipe which would occur if the water inlet pipe were connected directly to raw water at a relatively low temperature.

5. The combination as defined in claim 4 together with a circulating pump in the outlet conduit for the heat exchange device, said pump being thermostatically controlled for operation only when the temperature in the exhaust duct reaches a predetermined minimum, said pump being on the discharge side of the heat exchange device eliminating any build up of pressure in the heat exchange device.

6. The combination as defined in claim 5 wherein said heat exchange device includes a coiled tube defining a cylinder, and a plurality of circular disks disposed on said coiled tube and arranged in inclined relation to the path of movement of heated products through the exhaust duct thereby increasing the effectiveness of the heat exchange between the heated exhaust products and the water in the coiled tube due to the increased frictional surface drag of the heated products across the disks.

References Cited in the file of this patent

UNITED STATES PATENTS

| | | |
|---|---|---|
| 1,264,442 | Rued | Apr. 30, 1918 |
| 1,720,537 | Barthel et al. | July 9, 1929 |
| 1,731,290 | Boltz | Oct. 15, 1929 |
| 1,782,209 | Mauck | Nov. 18, 1930 |
| 2,152,331 | Shoemaker | Mar. 28, 1939 |
| 2,312,292 | Tyson | Feb. 23, 1943 |
| 2,365,791 | Wineman | Dec. 26, 1944 |
| 2,641,062 | Wentz | June 9, 1953 |

FOREIGN PATENTS

| | | |
|---|---|---|
| 138,646 | Australia | Sept. 12, 1950 |